Oct. 6, 1925.

R. G. HANSON 1,556,439

WAVE TRANSMISSION OF POWER

Filed Sept. 26, 1923        2 Sheets-Sheet 1

INVENTOR
RICHARD GREENWOOD HANSON

ATTORNEYS

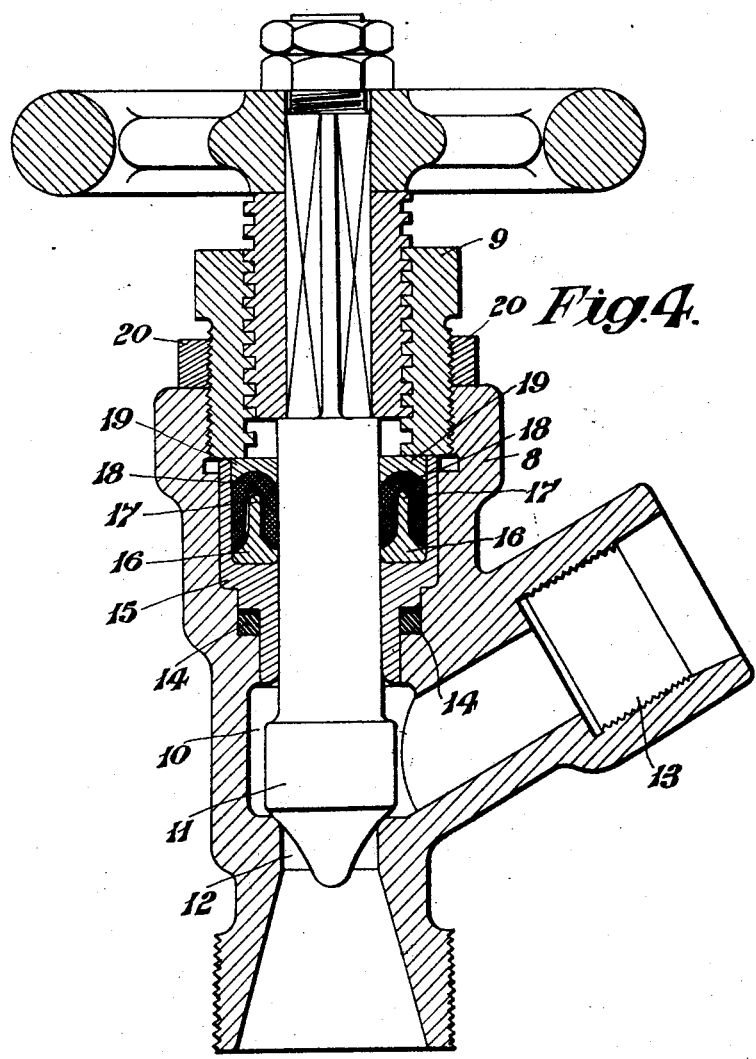

Patented Oct. 6, 1925.

1,556,439

UNITED STATES PATENT OFFICE.

RICHARD GREENWOOD HANSON, OF STAFFORD, ENGLAND.

WAVE TRANSMISSION OF POWER.

Application filed September 26, 1923. Serial No. 665,035.

*To all whom it may concern:*

Be it known that I, RICHARD GREENWOOD HANSON, a subject of the King of Great Britain, and resident of Stafford, in the county of Stafford, England, have invented certain new and useful Improvements Relating to Wave Transmission of Power, of which the following is a specification.

This invention relates to what is now known generally as wave transmission of power and has reference to the system of power transmission disclosed in the specifications of British Letters Patent Nos. 5152/13 and 9029/13, granted to Gogu Constantinesco.

As is well known according to this system alternating pressure waves are set up and it is sometimes desirable to damp or reduce these pressure waves or transform them from waves of one amplitude or pressure to waves of another amplitude or pressure.

I have found that these objects can be accomplished by interposing between the source of generation of the alternating pressure waves and the place of their application a member having a leak and I have found that both the magnitude of the leak— that is its cross sectional area and also the length of the leakage path are material factors in design. In other words a long leakage path of comparatively large sectional area will produce the same effect as a shorter leakage path of smaller sectional area. One application of the invention is for the protection of packings in wave transmission apparatus. It has been found that packings deteriorate very rapidly under the influence of the alternating pressures but last a considerable time when subjected to steady pressures and according to the present invention if, what for convenience may be termed, a transformer bush is interposed between the source of the alternating pressure waves and the packing these pressure waves can be damped down so that the packing is subjected to a steady mean pressure considerably lower than the pressure in the wave transmission line. In order to eliminate the pressure fluctuations altogether the transformer or resistance bush would need to be of or beyond a certain length for a given area of leakage path but it will be found that by shortening the length of the leakage path and/or increasing its sectional area the effect will be to change the frequency and pressure of the alternating pressure of the alternating pressure waves and this may be found of fundamental importance in meeting certain practical problems. It will be gathered from the foregoing that the present invention consists of a means for damping out or controlling pressure fluctuations in hydraulic apparatus by interposing between the source of pressure and its point of application what, as before mentioned, may be termed a transformer or resistance bush having a leakage path. It follows that by providing means for varying the length and/or sectional area of the leakage path variable effects can be obtained as the bush will operate as a variable resistance.

In order that the invention may be clearly understood several embodiments of the same will now be described by aid of the accompanying drawings in which:—

Figures 2, 3 and 4, show the invention applied to a rock drill and a screw down valve respectively as a means for protecting the packing from alternating pressures which as a consequence of the means shown, are transformed to substantially continuous pressures at the packings.

Figure 1:
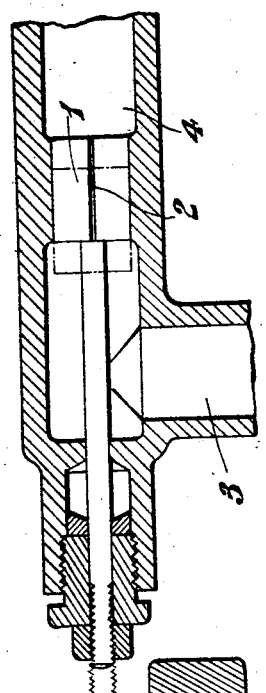
Fig. 1 is a diagram showing the invention applied as a transformer adapted to be inserted between the generator and the apparatus to be operated for varying the amplitude of the wave.

The practical application of the invention shown in the drawings takes the form of a member disposed in the path of the pressure waves which member is such as to permit the pressure waves to flow past it by leakage only, the extent of such leakage being dependent upon the final wave amplitude and pressure required. In Figure 1 this member takes the form of a sliding piston 1 having a longitudinal leakage path 2 which piston is so mounted as to be interposed between the inlet 3 from the generator, not shown, and one or more outlets 4 leading to the apparatus or apparatuses to be operated. By this means the pressure waves in 3, which are of considerable amplitude and pressure are damped down to a smaller amplitude and pressure by the time they have traversed the leakage path 2 and entered 4.

As the final wave amplitude and pressure is dependent upon the length and/or area of the leakage path it will be readily seen that this may be varied as desired by sliding the piston 1 so as to increase or shorten the effective length of the leakage path.

Figure 3:
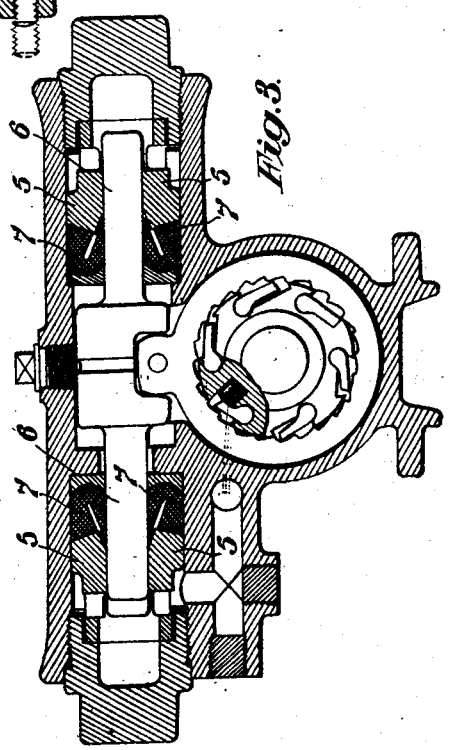
Figure 2:
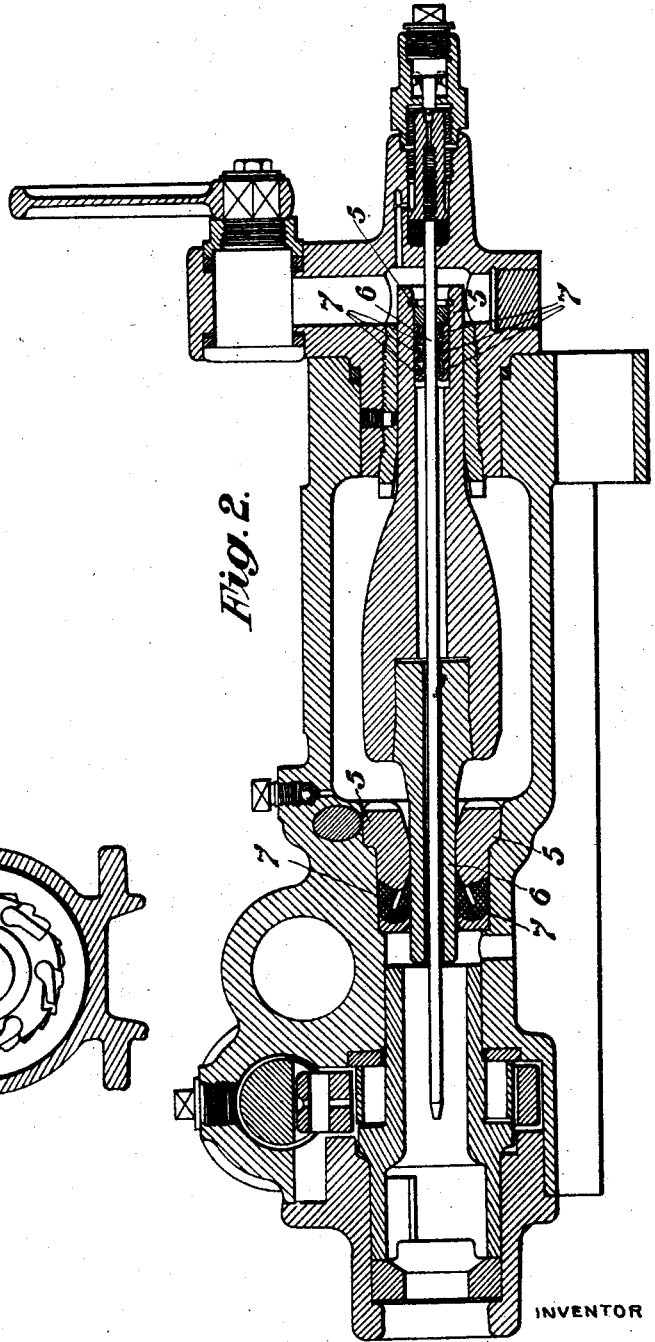

In the embodiment illustrated in Figures 2 and 3 the invention is shown applied as a protective medium for the spindle packings of a wave transmission rock drill. In these figures the interposed member takes the form of a bush 5 encircling the desired spindle 6 the inner end of such bush being shaped so as to abut against the adjacent end of the packing 7 or, as shown in Figure 4 to fit in the open side of the packing and bear against the bottom of the recess. The desired leakage in this example may be obtained, either by allowing for a predetermined slackness in fit between the engaging surfaces of the bush and the spindle or by providing a special leakage path as illustrated in Figure 1.

In Figure 4 the invention is shown applied as a protective medium for the packing of a screw down valve for use in connection with wave transmission of power. The screw down valve shown comprises a hollow body 8 which is bored out to provide a stepped interior of four diameters the largest diameter being at the top end of the body and threaded internally for the reception of a nut 9. The portion of the bore having the smallest diameter opens out into a chamber 10 which is adapted to contain the head of the valve 11 the seating for which is formed in the bottom of this enlarged chamber, and around the edge of an outlet opening 12. The inlet 13 for the pressure fluid leads into the enlarged chamber from the side and above the seating face of the valve.

The valve is first positioned in the hollow casing from the top end. An annular packing washer 14 is next inserted such washer seating upon the bottom annular surface of the stepped bore having the third largest diameter. An annular sleeve 15 is next inserted also from the top end of the casing the outside of which sleeve is stepped to conform to the stepped interior of the bore of the body which it serves to fill, one of its under faces opposing the aforementioned annular packing washer. The interior of this sleeve is bored out from its upper end for approximately half its length the remaining portion or lower half being bored so as to constitute a working fit for the valve spindle which it embraces.

In the recess so provided in the upper half of this annular sleeve is then fitted an annular member 16 the base of which is flat and of such a dimension as to fill the space between the side of the recess and the valve spindle which spindle it closely embraces. Projecting centrally from this base, and formed integral therewith is an upstanding annular ring 17 adapted to enter the U washer 18 which is inserted next in the order of assembly.

The remaining portion of the recess in the the annular sleeve is filled by means of a saddle ring 19 the underside of which is shaped to closely conform to the top of the U washer upon which it rests whilst the top side of this saddle ring is flat and such saddle ring is adapted to be pressed down against the U washer by means of the aforementioned nut until the top or flat surface of the saddle ring resides flush with the top edge of the annular sleeve. When the nut is positioned by being screwed down into the threaded recess on the upper end of the valve body it is locked in position by means of a lock nut 20 engaging the exterior of the nut which lock nut is screwed tightly down against the top face of the valve body.

In this example the annular member 16 serves to damp the pressure waves the required leakage being such as to transform the pressure from an alternating high pressure to a substantially continuous and lower pressure on the side of the member where the packing is situated.

What I claim and desire to secure by Letters Patent is:—

1. In wave transmission power apparatus means for transforming the amplitude and pressure of alternating pressure waves comprising a leakage path interposed between the source of pressure generation and the point where the pressure is applied.

2. In wave transmission power apparatus means for transforming the amplitude and pressure of alternating pressure waves comprising a bush having a leakage path interposed between the source of pressure generation and its point of application.

3. In wave transmission power apparatus means for transforming the amplitude and pressure of alternating pressure waves comprising a bush having a leakage path interposed between the source of pressure generation and its point of application the effective area of which leakage path is variable.

4. In wave transmission power apparatus means for transforming the amplitude and pressure of alternating pressure waves comprising a transformer bush in the form of a sliding piston provided with a leakage path and interposed between the source of pressure and its point of application and means for adjusting the position of said sliding piston to vary the length of the leakage path for the purpose specified.

5. In wave transmission power apparatus means for transforming the amplitude and pressure of alternating pressure waves comprising a transformer bush having a groove in it constituting a leakage path such bush being interposed between the source of pressure generation and the point where the pressure is applied.

6. In wave transmission power apparatus means for transforming the amplitude and pressure of alternating pressure waves comprising a transformer bush in the form of a sliding piston provided with a leakage path in the form of a longitudinal groove such bush being interposed between the source of pressure generation and its point of application and means for adjusting the position of said sliding piston to vary the length of the leakage path for the purpose specified.

In witness whereof I affix my signature.

RICHARD GREENWOOD HANSON.